United States Patent Office 3,483,126
Patented Dec. 9, 1969

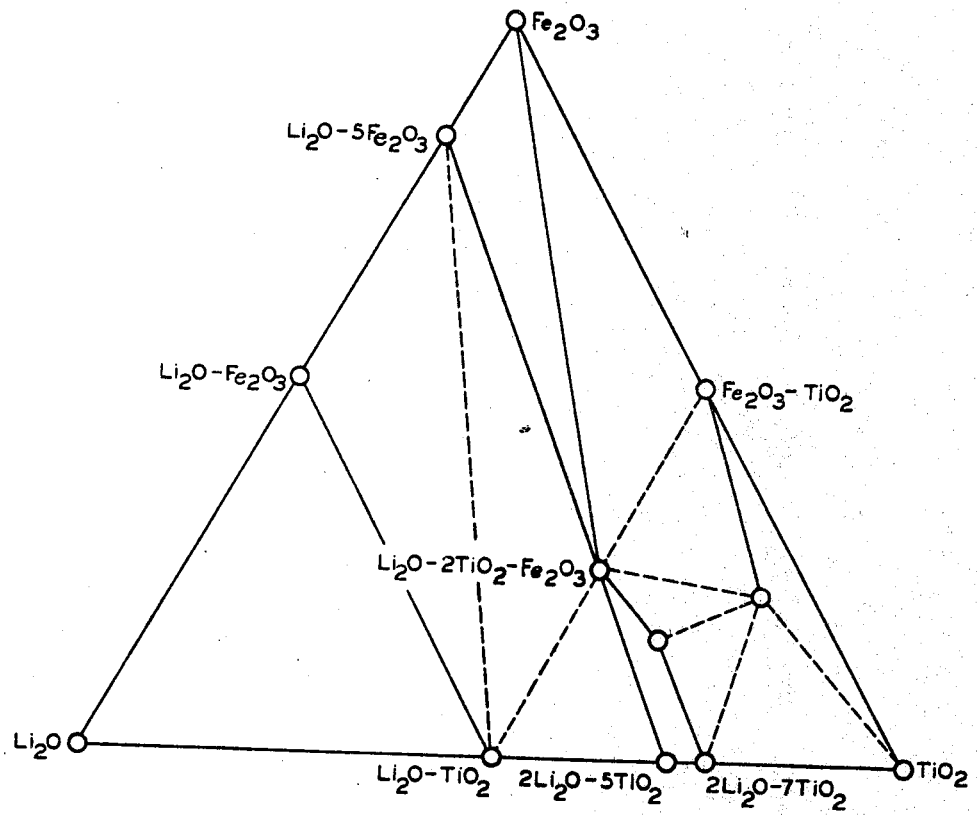

3,483,126
FERRITE MATERIALS CONTAINING TITANIUM OR MANGANESE
Raymond V. Sara, North Olmsted, Ohio, Mason C. Cox, Southbridge, Mass., and Norman R. Thielke, North Olmsted, Ohio, assignors to Union Carbide Corporation, a corporation of New York
Continuation of application Ser. No. 577,557, May 17, 1966. This application May 15, 1968, Ser. No. 752,405
The portion of the term of the patent subsequent to July 2, 1980, has been disclaimed
Int. Cl. H01f 1/10; C04b 35/26
U.S. Cl. 252—62.59                     9 Claims

ABSTRACT OF THE DISCLOSURE

A ferrite material of spinel structure suitable for use as low loss cores in electric components, the material having the formula:

$[m(Li_2O \cdot bRO_2 \cdot cFe_2O_3)]$·

$$\left[(100-m)\left(\frac{1+2b-3c}{4}\right)(R'O \cdot Fe_2O_3)\right]$$

wherein $b$ is from 0.5 to 2.5; $c$ is from 0 to 4; the sum of $b$ and $c$ is from 2.5 to 4.5; $m$ is from about 20 to about 99 mole percent; R is titanium or manganese; and ($R'O \cdot Fe_2O_3$) is a normal ferrite, an inverse ferrite, or a mixed normal and inverse ferrite, the material containing at least about 10 mole percent $Fe_2O_3$ and having a magnetic permeability higher than that of the end member ($Li_2O \cdot bRO_2 \cdot cFe_2O_3$) alone.

---

This application is a continuation of application Ser. No. 577,557, filed May 17, 1966, now abandoned, which is in turn a continuation-in-part of application Ser. No. 273,163, filed Apr. 15, 1963, and now abandoned, and Ser. No. 704,732, filed Dec. 23, 1957, now U.S. 3,096,288.

This invention relates generally to ferrite materials and, more particularly, to a new series of ferritic compositions having improved magnetic properties.

The single figure is a ternary phase diagram which illustrates certain aspects of this inveniton.

Ferrites have rapidly attained commercial importance because of their property of becoming magnetized in the presence of a low-to-medium strength magnetic field. Since this magnetization is not permanent, most of these materials are designated as magnetically "soft." Pure iron shows analogous behaviour among the metallic magnetic materials. Ferrites have also been found to have high electrical resistivity, many orders of magnitude above that of metals. Because of this high resistivity, the eddy current losses developed in a ferrite core of a radio frequency transformer, for example, are markedly lower than similar losses in a laminated or powdered iron core.

Most of the ferrite materials proposed in the prior art can be described by the formula $RO \cdot Fe_2O_3$ where R is a doubly charged ion or is fractionally composed of two or more ions. Examples of such materials are zinc ferrite, a binary nickel-zinc ferrite, a ternary nickel-copper-zinc ferrite, and a quaternary magnesium-manganese-nickel-zinc ferrite. Minor additions of other oxides (e.g., $Li_2O$; BeO, CaO, and PbO; $Ga_2O_3$; $Cd_2O_3$; $SiO_2$, $TiO_2$, or $ZrO_2$) have also been proposed for various purposes. In general, however, nearly all the ferrite materials heretofore proposed involve only oxides of divalent metals, either in the original formulation or in the final aggregate resulting from heat treatment.

In contrast to the $RO \cdot Fe_2O_3$ compositions of the prior art, the present invention is concerned with compositions in which oxides of other than divalent metals are employed. In accordance with the invention, there is provided a ferrite material of spinel structure suitable for use as low loss cores in electric components, the material having the formula:

$[m(Li_2O \cdot bRO_2 \cdot cFe_2O_3)]$·

$$\left[(100-m)\left(\frac{1+2b+3c}{4}\right)(R'O \cdot Fe_2O_3)\right]$$

wherein $b$ is from 0.5 to 2.5; $c$ is from 0 to 4; the sum of $b$ and $c$ is from 2.5 to 4.5; $m$ is from about 20 to about 99 mole percent; R is titanium or manganese; and ($R'O \cdot Fe_2O_3$) is a normal ferrite, an inverse ferrite, or a mixed normal and inverse ferrite, the material containing at least about 10 mole percent $Fe_2O_3$ and having a magnetic permeability higher than that of the end member ($Li_2O \cdot bRO_2 \cdot cFe_2O_3$) alone. A preferred group of ferrites of this invention are those of the above formula wherein $b$ is from 0.5 to 2.0 and $c$ is from 1.0 to 4.0.

The end member having the formula $(Li_2O \cdot bRO_2 \cdot cFe_2O_3)$ referred to hereinafter as the "substituted" ferrite end member, is described and claimed in the aforementioned U.S. 3,096,288. The invention of these substituted ferrites was based on the realization that one of the oxides present in the conventional ferrite formula ($RO \cdot Fe_2O_3$) can be replaced by two or more oxides of non-divalent metals. Thus, the composition of the substituted ferrite end members may be designated as one of multiple substitution of oxides other than the RO type for those of the RO type in the usual $RO \cdot Fe_2O_3$ formulation. Although the permutations of multiple oxide substitution as described above are very numerous, the present invention relates mainly to two such systems; the $Li_2O$-$TiO_2$-$Fe_2O_3$ system and the $Li_2O$-$MnO_2$-$Fe_2O_3$ system.

Referring now to the ternary phase diagram shown in the drawing, while a great variety of substituted ferrites in the $Li_2O$-$TiO_2$-$Fe_2O_3$ system are useful end members in the present invention, the following compositons are considered especially useful:

(1) Ferrospinel-type compositions along join $Li_2O \cdot 5Fe_2O_3$-$Li_2O \cdot 2TiO_2 \cdot Fe_2O_3$ (2) Two-phase bodies in the compositional areas defined by the compatibility triangles immediately adjacent to the spinel-type solid solution join, $Li_2O \cdot 5Fe_2O_3$-$Li_2O \cdot 2TiO_2 \cdot Fe_2O_3$ (a) triangle $Li_2O \cdot 5Fe_2O_3$-$Li_2O \cdot TiO_2 \cdot Fe_2O_3$-$Li_2O \cdot TiO_2$,
(b) triangle $Li_2O \cdot 5Fe_2O_3$-$Li_2O \cdot 2TiO_2 \cdot Fe_2O_3$-$Fe_2O_3$, and
(c) triangle $Li_2O \cdot 2TiO_2 \cdot Fe_2O_3$-$Li_2O \cdot TiO_2$-$2Li_2O \cdot 5TiO_2$.

(3) Multiphase bodies in the compositional areas defined by the compatibility triangles next most adjacent to the ferrospinel solid solution join:

(a) triangle $Li_2O \cdot 5Fe_2O_3$-$Li_2O \cdot TiO_2$-$Li_2O \cdot Fe_2O_3$, and
(b) triangle $Li_2O \cdot 2TiO_2 \cdot Fe_2O_3$-$Fe_2O_3$-$Fe_2O_3 \cdot TiO_2$.

The normal, inverse, or mixed normal and inverse ferrite end member has the formula $(R'O \cdot Fe_2O_3)$ wherein $R'$ is at least one cation selected from the group consisting of zinc, cadmium, copper, magnesium, manganese, nickel, and cobalt. The crystal structure of these ferrites conforms to the cubic structure called the spinel structure, as in the natural mineral $MgO \cdot Al_2O_3$. The unit cell of the spinel structure is a cubic arrangement of 32 anions (oxygen ions) with 24 cations (A, B) distributed in certain interstices between the anions. In certain spinels, the type A cations occupy lattice sides formed by four adjoining anions and are said to be tetrahedrally coordinated, while the type B cations occupy lattice sides formed by six adjoining anions and are said to be octahedrally coordinated. These spinels are known as "normal" spinels and are formulated as $AB_2O_4$. Examples of normal ferrites are zinc ferrite and cadmium ferrite. In other spinels, half the type B cations occupy tetrahedral sites, while the other half of the type B cations and the type A cations share octahedral sites. These spinels are known as "inverse" spinels and are formulated as $BA\ BO_4$. Examples of inverse ferrites are the ferrites of copper, magnesium, nickel, and cobalt. By combining a normal and an inverse ferrite, a mixed normal and inverse ferrite, such as a nickel-zinc ferrite is obtained.

The present invention stems from the unexpected discovery that the combination of the substituted ferrite end member and the normal, inverse, or mixed ferrite end member in a solid solution produces a synergistic effect, i.e., the resultant ferrite material has significantly improved properties which are not predictable from the properties of the two end members. For example, the permeability of many of the inventive ferrites is considerably higher than that of either end member alone. This is especially true of the ferrites having zinc ferrite or cadmium ferrite as an end member.

The amount of the substituted ferrite end member in the inventive ferrite compositions can range from about 20 to about 99 mole percent, and is preferably between about 30 and about 80 mole percent. It is to be understood that all mole percentages referred to herein are based on a basic composition in whose formulary description the oxygen ion contents of the two end members are matched, as indicated by the quantity $$\left(\frac{1+2b+3c}{4}\right)$$

in the aforedescribed formula. Also, in order to obtain the desired magnetic spinel structure in the subject ferritic compositions, it is essential that the total $Fe_2O_3$ content be at least about 10 mole percent of the final composition.

Briefly stated, the ferrites of the invention are prepared by finely dividing oxides or carbonates containing the desired ions, mixing the same in the dry state, wet milling a slurry of the reactants, drying the slurry, precalcining the dried slurry to a temperature below the particular final sintering temperature for these reactants to effect substantially complete transformation thereof to the ferrite form; cooling the calcined mass and repulverizing the resultant calcine; forming a compressed body therefrom, preferably with plasticizers and bonding agents; firing the formed body at a temperature of 950° C. to 1350° C. and then cooling the fired body.

In a series of examples of the invention, a number of different compositions were prepared from mixtures of appropriate amounts of the desired oxides, using $Li_2CO_3$ as a source of $Li_2O$. For example a ferrite having the formula $Li_{0.23}Ti_{0.06}Zn_{0.60}Fe_{2.11}O_4$ was prepared from 9.25 grams $Li_2CO_3$, 5.00 grams $TiO_2$, 54.00 grams ZnO, and 187.00 grams $Fe_2O_3$. These oxides and carbonate were mixed as a slurry with alcohol for approximately one hour, and the resulting powder mixture was then placed in fire clay crucibles and calcined at 1050° C. to 1250° C. for two hours in an air atmosphere. The resulting ferrite powder, which consisted only of a spinel phase, was milled with alcohol (100 cc. for the specific mixture given above) in a porcelain mill with Alundum balls for five hours. The slurry was then discharged and permitted to dry in an oven at 55° C. The fine-ground ferrite powder was mixed thoroughly with a 2 percent solution of methocel (30 cc. of solution to 50 grams of ferrite powder), and the slurry was then permitted to dry at 55° C. to a hard cake, which was pulverized to pass a 20 mesh sieve. Five percent water was added to this powder, and the mixture was sealed in a jar and allowed to stand overnight. The powder was then pressed as bars and toroids under a load of 5000 p.s.i. The toroids were fired on setters lined with platinum at a peak temperature of 1285° C. for periods of 4 to 16 hours. The rate of heating to the peak temperature was 200° C. per hour in an air atmosphere, and cooling was at the normal free kiln cooling rate.

The end members of the general compositions produced by the aforedescribed procedure are shown in the following table:

| Code Designations | Composition |
| --- | --- |
| LZ-1 to 12 or 2010-A to S | $Li_2O \cdot 5Fe_2O_3$ to $ZnO \cdot Fe_2O_3$. |
| LTZ-14 to 25 or 218-A to S | $Li_2O \cdot 5TiO_2 \cdot 4Fe_2O_3$ to $ZnO \cdot Fe_2O_3$. |
| LTZ-1 to 13 or 226-A to S | $Li_2O \cdot 1.0TiO_2 \cdot Fe_2O_3$ to $ZnO \cdot Fe_2O_3$. |
| LTZ-26 to 37 or 234-A to S | $Li_2O \cdot 1.5TiO_2 \cdot 2Fe_2O_3$ to $ZnO \cdot Fe_2O_3$. |
| LTZ-38 to 49 or 242-A to S | $Li_2O \cdot 2.0TiO_2 \cdot 1Fe_2O_3$ to $ZnO \cdot Fe_2O_3$. |

It will be noted that the lithium-containing substituted ferrite end members listed above contain a variable total of 16 to 8 oxygen ions in the respective formulations, whereas the normal zinc ferrite end member contains only four oxygen ions. Therefore, batches were made up on the basis of matching oxygen ion content, as shown in the following tabulation:

| Mols | Mols | Oxygen Ion Balanc |
| --- | --- | --- |
| 1.0 $Li_2O \cdot 5Fe_2O_3$ | 4.0 $ZnO \cdot Fe_2O_3$ | 16:16 |
| 1.0 $Li_2O \cdot 0.5TiO_2 \cdot 4Fe_2O_3$ | 3.5 $ZnO \cdot Fe_2O_3$ | 14:14 |
| 1.0 $Li_2O \cdot 1.0TiO_2 \cdot 3Fe_2O_3$ | 3.0 $ZnO \cdot Fe_2O_3$ | 12:12 |
| 1.0 $Li_2O \cdot 1.5TiO_2 \cdot 2Fe_2O_3$ | 2.5 $ZnO \cdot Fe_2O_3$ | 10:10 |
| 1.0 $Li_2O \cdot 2.0TiO_2 \cdot 1Fe_2O_3$ | 2.0 $ZnO \cdot Fe_2O_3$ | 8:8 |

The ferrite compositions of this invention can be prepared from starting reaction mixtures other than the approximately stoichiometric compositions. For example, compositions which fall within the two-phase and multiphase compatibility triangles as described hereinabove with reference to the drawings will always produce a ferrite composition of this invention. Where the starting composition is within the compatibility triangles and is not a stoichiometric composition, the ferrite product of this invention will be mixed with one or more additioinal materials which are not ferrites. These additional materials tend to reduce the magnetic permeability of the product. However, even when the product s a mixture of ferrite and non-ferrite, the ferrite composition of this invention will always be present as a distinct and identifiable phase.

The specific compositions produced by the aforedescribed procedure are listed in the following tables along with the properties of each composition. In Tables I–X the zinc ferrite ratio in the third column of the tables is expressed in mole percent and corresponds to the quantity (100-$m$) in the general formula for the ferrite compositions of this invention.

TABLE I.—PROPERTIES OF SINTERED FERRITE BAR CORES—COMPOSITION SERIES
[1.0 (Li$_2$O·5Fe$_2$O$_3$)-4.0(ZnO·Fe$_2$O$_3$)]

| Code No. 2010 | LZ | Zinc Ferrite Ratio, Percent | Core Volume, cm.$^3$ | Filling Factor | Apparent Density, g./cm.$^3$ | Theoretical Density, Percent | Permeability Observed* | Permeability Computed** | Quality Observed | Q$_c$/Q$_o$ | Resistivity (Log Value), ohm-cm. |
|---|---|---|---|---|---|---|---|---|---|---|---|
| A | 1 | 0 | 4.77 | 0.230 | 4.16 | 87.8 | 6.77 | 31.8 | 30 | 0.38 | 4.83 |
| C | 2 | 10 | 4.60 | 0.222 | 4.17 | 86.7 | 8.12 | 40.4 | 23 | 0.29 | 4.36 |
| E | 3 | 20 | 4.49 | 0.217 | 4.22 | 86.7 | 9.02 | 44.6 | 36 | 0.46 | 2.75 |
| G | 4 | 30 | 4.69 | 0.226 | 4.19 | 85.0 | 10.37 | 57.8 | 23 | 0.29 | 3.88 |
| I | 5 | 40 | 4.27 | 0.206 | 4.37 | 87.5 | 9.66 | 53.3 | 34 | 0.43 | 2.68 |
| K | 6 | 50 | 3.97 | 0.192 | 4.46 | 88.1 | 9.00 | 53.4 | 31 | 0.39 | 2.54 |
| M | 7 | 60 | 5.05 | 0.244 | 4.72 | 92.2 | 10.98 | 51.0 | 21 | 0.27 | 2.58 |
| N | 8 | 65 | 3.59 | 0.173 | 4.62 | 89.8 | 9.32 | 62.7 | 17 | 0.22 | 2.45 |
| O | 9 | 70 | 3.66 | 0.177 | 4.69 | 90.5 | 9.35 | 61.0 | 11 | 0.14 | 2.34 |
| P | 10 | 75 | 3.52 | 0.170 | 4.63 | 89.0 | 2.69 | 13.7 | 17 | 0.22 | 2.32 |
| Q | 11 | 80 | 3.72 | 0.181 | 4.72 | 90.3 | 1.39 | 3.7 | 31 | 0.39 | 2.30 |
| S | 12 | 90 | 3.82 | 0.184 | 4.75 | 90.0 | 1.02 | 1.1 | 74 | 0.94 | 2.32 |
| | | | V$_o$=20.7 | | | | | | Q$_o$=79 | | |

*Observed effective relative initial permeability.
**Computed effective relative initial permeability at 100 percent coil occupancy.
NOTE.—Frequency: 0.90 mc./s.

TABLE II.—PROPERTIES OF SINTERED FERRITE BAR CORES—COMPOSITION SERIES
[1.0 (Li$_2$O·0.5TiO$_2$·4Fe$_2$O$_3$)-3.5 (ZnO·Fe$_2$O$_3$)]

| Code No. 218 | LTZ | Zinc Ferrite Ratio, Percent | Core Volume, cm.$^3$ | Filling Factor | Apparent Density, g./cm.$^3$ | Theoretical Density, Percent | Permeability Observed* | Permeability Computed** | Quality Observed | Q$_c$/Q$_o$ | Resistivity (Log Value) ohm-cm. |
|---|---|---|---|---|---|---|---|---|---|---|---|
| A | 14 | 0 | 3.88 | 0.188 | 4.19 | 90.5 | 5.00 | 27.8 | 51 | 0.68 | 1.99 |
| C | 15 | 10 | 3.73 | 0.180 | 4.36 | 92.5 | 5.77 | 34.8 | 45 | 0.60 | 2.11 |
| E | 16 | 20 | 3.94 | 0.190 | 4.37 | 91.4 | 6.84 | 39.6 | 46 | 0.61 | 2.00 |
| G | 17 | 30 | 3.90 | 0.188 | 4.33 | 89.2 | 8.43 | 50.8 | 37 | 0.49 | 2.42 |
| I | 18 | 40 | 4.11 | 0.198 | 4.35 | 88.3 | 10.00 | 58.6 | 32 | 0.43 | 2.20 |
| K | 19 | 50 | 4.24 | 0.205 | 4.34 | 86.8 | 10.90 | 61.4 | 29 | 0.39 | 3.87 |
| M | 20 | 60 | 3.87 | 0.187 | 4.50 | 88.8 | 11.03 | 70.4 | 24 | 0.32 | 3.93 |
| N | 21 | 65 | 3.89 | 0.188 | 4.51 | 88.5 | 10.95 | 67.4 | 22 | 0.29 | 4.64 |
| O | 22 | 70 | 4.16 | 0.202 | 4.56 | 88.9 | 10.78 | 61.8 | 16 | 0.21 | 4.85 |
| P | 23 | 75 | 3.88 | 0.188 | 4.70 | 90.8 | 5.88 | 33.7 | 12 | 0.16 | 3.54 |
| Q | 24 | 80 | 3.72 | 0.180 | 4.74 | 91.1 | 1.84 | 7.0 | 18 | 0.24 | 2.04 |
| S | 25 | 90 | 3.78 | 0.183 | 4.83 | 91.5 | 1.03 | 1.2 | 67 | 0.89 | 2.43 |
| | | | V$_o$=20.7 | | | | | | Q$_o$=75 | | |

*Observed effective relative initial permeability.
**Computed effective relative initial permeability at 100 percent coil occupancy.
NOTE.—Frequency: 0.85 mc./s.

TABLE III.—PROPERTIES OF SINTERED FERRITE BAR CORES—COMPOSITION SERIES
[1.0 (Li$_2$O·1.0TiO$_2$·3Fe$_2$O$_3$)-3.0 (ZnO·Fe$_2$O$_3$)]

| Code No. 226 | LTZ | Zinc Ferrite Ratio, Percent | Core Volume, cm.$^3$ | Filling Factor | Apparent Density, g./cm.$^3$ | Theoretical Density, Percent | Permeability Observed* | Permeability Computed** | Quality Observed | Q$_c$/Q$_o$ | Resistivity (Log Value), ohm-cm |
|---|---|---|---|---|---|---|---|---|---|---|---|
| A | 1 | 0 | 4.34 | 0.210 | 3.92 | 87.5 | 7.13 | 38.8 | 18 | 0.24 | 3.75 |
| C | 2 | 10 | 5.51 | 0.266 | 3.78 | 82.8 | 8.59 | 35.2 | 15 | 0.20 | 4.81 |
| E | 3 | 20 | 4.76 | 0.230 | 3.80 | 81.5 | 9.10 | 44.3 | 16 | 0.21 | 4.71 |
| G | 4 | 30 | 4.66 | 0.225 | 3.85 | 81.0 | 10.2 | 51.3 | 19 | 0.25 | 4.60 |
| I | 5 | 40 | 5.41 | 0.262 | 3.83 | 79.1 | 12.6 | 54.2 | 18 | 0.24 | 4.54 |
| K | 6 | 50 | 5.17 | 0.250 | 4.03 | 81.8 | 13.5 | 62.0 | 16 | 0.21 | 4.36 |
| L | 7 | 55 | 5.08 | 0.245 | 4.35 | 87.5 | 13.6 | 63.7 | 16 | 0.21 | 4.00 |
| M | 8 | 60 | 4.21 | 0.203 | 4.17 | 83.2 | 12.8 | 72.8 | 15 | 0.20 | 4.20 |
| N | 9 | 65 | 4.13 | 0.200 | 4.24 | 83.9 | 12.4 | 72.3 | 14 | 0.19 | 4.04 |
| O | 10 | 70 | 4.50 | 0.217 | 4.35 | 85.5 | 12.6 | 67.3 | 12 | 0.16 | 4.11 |
| P | 11 | 75 | 4.10 | 0.198 | 4.52 | 88.0 | 3.58 | 17.5 | 11 | 0.15 | 2.66 |
| Q | 12 | 80 | 3.95 | 0.191 | 4.47 | 86.4 | 1.35 | 3.3 | 28 | 0.37 | 2.83 |
| S | 13 | 90 | 4.00 | 0.193 | 4.70 | 89.5 | 1.03 | 2.0 | 74 | 0.99 | 2.61 |
| | | | V$_o$=20.7 | | | | | | Q$_o$=75 | | |

* Observed effective relative initial permeability.
** Computed effective relative initial permeability at 100% coil occupancy.
NOTE.—Frequency: 0.85 mc./s.

TABLE IV.—PROPERTIES OF SINTERED FERRITE BAR CORES—COMPOSITION SERIES
[1.0 (Li$_2$O·1.5TiO$_2$·2Fe$_2$O$_3$)-2.5 (ZnO·Fe$_2$O$_3$)]

| Code No. 234 | LTZ | Zinc Ferrite Ratio, Percent | Core Volume, cm.$^3$ | Filling Factor | Apparent Density, g./cm.$^3$ | Theoretical Density, Percent | Permeability Observed* | Permeability Computed** | Quality Observed | Q$_c$/Q$_o$ | Resistivity (Log Value), ohm-cm |
|---|---|---|---|---|---|---|---|---|---|---|---|
| A | 26 | 0 | 5.00 | 0.242 | 3.54 | 82.9 | 4.81 | 20.1 | 53 | 0.67 | 4.91 |
| C | 27 | 10 | 5.05 | 0.244 | 3.66 | 83.5 | 6.98 | 30.8 | 40 | 0.51 | 4.88 |
| E | 28 | 20 | 5.21 | 0.252 | 3.74 | 83.3 | 8.85 | 38.8 | 11 | 0.14 | 4.79 |
| G | 29 | 30 | 5.08 | 0.245 | 3.82 | 82.0 | 10.62 | 48.9 | 12 | 0.15 | 4.76 |
| I | 30 | 40 | 5.28 | 0.255 | 4.27 | 90.5 | 12.38 | 55.1 | 15 | 0.19 | 4.67 |
| K | 31 | 50 | 4.92 | 0.238 | 4.04 | 83.5 | 13.02 | 63.1 | 16 | 0.20 | 4.61 |
| L | 32 | 55 | 4.61 | 0.223 | 4.13 | 84.7 | 13.60 | 70.6 | 15 | 0.19 | 4.53 |
| M | 33 | 60 | 4.53 | 0.218 | 4.25 | 86.3 | 13.60 | 72.6 | 12 | 0.15 | 4.28 |
| N | 34 | 65 | 4.38 | 0.212 | 4.30 | 86.4 | 12.83 | 70.2 | 12 | 0.15 | 3.36 |
| O | 35 | 70 | 4.45 | 0.215 | 4.36 | 86.7 | 3.50 | 15.6 | 10 | 0.13 | 3.48 |
| Q | 36 | 80 | 4.34 | 0.210 | 4.49 | 87.5 | 1.07 | 5.0 | 53 | 0.67 | 2.65 |
| S | 37 | 90 | 3.92 | 0.190 | 4.74 | 90.6 | 1.02 | 1.1 | 76 | 0.96 | 2.71 |
| | | | V$_o$=20.7 | | | | | | Q$_o$=79 | | |

*Observed effective relative initial permeability.
** Computed effective relative initial permeability at 100% coil occupancy.
NOTE.—Frequency: 0.90 mc./s.

TABLE V.—PROPERTIES OF SINTERED FERRITE BAR CORES—COMPOSITION SERIES
[1.0 ($Li_2O \cdot 2.0TiO_2 \cdot Fe_2O_3$)-2.0 ($ZnO \cdot Fe_2O_3$)]

| Code No. 242 | LTZ | Zinc Ferrite Ratio, Percent | Core Volume, cm.³ | Filling Factor | Apparent Density, g./cm.³ | Theoretical Density, Percent | Permeability Observed* | Permeability Computed** | Quality Observed | Quality $Q_c/Q_o$ | Resistivity (Log Value), ohm-cm. |
|---|---|---|---|---|---|---|---|---|---|---|---|
| A | 38 | 0 | 5.22 | 0.254 | (†) | | 1.26 | 2.3 | 40 | 0.53 | 4.98 |
| C | 39 | 10 | 4.86 | 0.235 | 3.56 | 89.1 | 4.64 | 20.0 | 18 | 0.24 | 4.96 |
| E | 40 | 20 | 5.02 | 0.242 | 3.67 | 85.2 | 6.88 | 30.7 | 13 | 0.17 | 4.94 |
| G | 41 | 30 | 5.54 | 0.267 | 3.71 | 86.8 | 10.30 | 43.1 | 13 | 0.17 | 4.94 |
| I | 42 | 40 | 5.97 | 0.288 | 3.72 | 82.0 | 13.18 | 51.2 | 15 | 0.20 | 4.92 |
| K | 43 | 50 | 5.28 | 0.255 | 3.92 | 83.8 | 14.31 | 64.1 | 15 | 0.20 | 4.91 |
| L | 44 | 55 | 5.43 | 0.262 | 3.99 | 84.2 | 14.72 | 64.3 | 14 | 0.19 | 4.89 |
| M | 45 | 60 | 4.85 | 0.234 | 4.10 | 85.3 | 14.52 | 71.8 | 12 | 0.16 | 4.89 |
| N | 46 | 65 | 4.66 | 0.225 | 4.24 | 86.9 | 3.89 | 16.7 | 8 | 0.11 | 3.76 |
| O | 47 | 70 | 4.62 | 0.223 | 4.32 | 87.5 | 1.20 | 2.1 | 33 | 0.44 | 4.72 |
| Q | 48 | 80 | 4.55 | 0.220 | 4.42 | 87.2 | 1.04 | 1.2 | 64 | 0.85 | 2.99 |
| S | 49 | 90 | 3.94 | 0.190 | 4.68 | 90.0 | 1.01 | 1.1 | 76 | 1.01 | 2.49 |
| | | | $V_o=20.7$ | | | | | | $Q_o=75$ | | |

* Observed effective relative initial permeability.
** Computed effective relative initial permeability at 100% coil occupancy.
† Specimen cracked.
NOTE.—Frequency: 0.90 mc./s.

TABLE VI.—PROPERTIES OF SINTERED FERRITE TOROID CORES—COMPOSITION SERIES
[1.0 ($Li_2O \cdot 5Fe_2O_3$)-4.0 ($ZnO \cdot Fe_2O_3$)]

| Code No. 2010 | LZ | Zinc Ferrite Ratio, Percent | Core Volume, cm.³ | Apparent Density, g./cm.³ | Theoretical Density, Percent | Observed* Permeability | Toroidal Quality | $Q_c/Q_o$ | $\mu_t Q_t$ | $\sqrt{\mu_t Q_t}$ | $1/\mu_t Q_t$ |
|---|---|---|---|---|---|---|---|---|---|---|---|
| A | 1 | 0 | 3.91 | 4.18 | 88.0 | 39.2 | 115 | 2.15 | 4,508 | 67.1 | .00022 |
| C | 2 | 10 | 3.94 | 4.14 | 86.0 | 64.5 | 108 | 2.04 | 6,966 | 83.5 | .00014 |
| E | 3 | 20 | 3.75 | 4.33 | 85.4 | 89.6 | 154 | 2.91 | 13,798 | 117.5 | .00007 |
| G | 4 | 30 | 3.88 | 4.23 | 85.8 | 134.0 | 154 | 2.91 | 20,636 | 143.7 | .00005 |
| I | 5 | 40 | 3.61 | 4.31 | 86.5 | 134.9 | 155 | 2.92 | 20,910 | 144.6 | .00005 |
| K | 6 | 50 | 3.46 | 4.36 | 86.2 | 163.5 | 137 | 2.58 | 22,400 | 149.7 | .00005 |
| M | 7 | 60 | 2.98 | 4.73 | 92.5 | 97.3 | 77 | 1.45 | 7,492 | 86.6 | .00013 |
| N | 8 | 65 | 2.90 | 4.57 | 89.0 | 94.6 | 58 | 1.09 | 5,487 | 74.1 | .00018 |
| O | 9 | 70 | 2.92 | 4.67 | 90.3 | 79.6 | 42 | 0.79 | 3,343 | 57.8 | .00030 |
| P | 10 | 75 | 3.00 | 4.70 | 90.5 | 20.9 | 46 | 0.87 | 963 | 31.0 | .00104 |
| Q | 11 | 80 | 3.14 | 4.68 | 89.5 | 3.9 | 48 | 0.91 | 187 | 13.7 | .00535 |
| S | 12 | 90 | 3.15 | 4.75 | 90.0 | 1.3 | 51 | 0.96 | 66 | 8.1 | .0151 |
| | | | | | | | $Q_o=53$ | | $\mu_o Q_o=53$ | 7.3 | .0189 |

* Observed effective absolute initial permeability.
NOTE.—Frequency: 1.177 mc./s.

TABLE VII.—PROPERTIES OF SINTERED FERRITE TOROID CORES—COMPOSITION SERIES
[1.0 ($Li_2O \cdot 0.5TiO_2 \cdot 4Fe_2O_3$)-3.5 ($ZnO \cdot Fe_2O_3$)]

| Code No. 218 | LTZ | Zinc Ferrite Ratio, Percent | Core Volume, cm.³ | Apparent Density, g./cm.³ | Theoretical Density, Percent | Observed* Permeability | Toroidal Quality | $Q_c/Q_o$ | $\mu_t Q_t$ | $\sqrt{\mu_t Q_t}$ | $1/\mu_t Q_t$ |
|---|---|---|---|---|---|---|---|---|---|---|---|
| A | 14 | 0 | 3.22 | 4.20 | 90.6 | 32.0 | 107 | 2.02 | 3,424 | 58.5 | .00029 |
| C | 15 | 10 | 3.18 | 4.29 | 90.8 | 46.6 | 118 | 2.23 | 5,499 | 74.2 | .00018 |
| E | 16 | 20 | 3.17 | 4.48 | 93.8 | 71.3 | 136 | 2.57 | 9,697 | 98.5 | .00010 |
| G | 17 | 30 | 3.22 | 4.29 | 88.3 | 114.4 | 140 | 2.64 | 16,016 | 126.6 | .00006 |
| I | 18 | 40 | 3.41 | 4.40 | 89.3 | 153.8 | 148 | 2.79 | 22,762 | 150.9 | .00004 |
| K | 19 | 50 | 3.46 | 4.44 | 89.1 | 197.5 | 136 | 2.57 | 26,860 | 163.9 | .00004 |
| M | 20 | 60 | 3.19 | 4.51 | 89.0 | 204.0 | 97 | 1.83 | 19,788 | 140.7 | .00005 |
| N | 21 | 65 | 3.22 | 4.51 | 88.7 | 171.0 | 83 | 1.57 | 14,193 | 119.1 | .00007 |
| O | 22 | 70 | 3.31 | 4.60 | 89.6 | 131.8 | 59 | 1.11 | 7,776 | 88.2 | .00013 |
| P | 23 | 75 | 3.34 | 4.52 | 87.5 | 40.1 | 38 | 0.72 | 1,524 | 39.0 | .00066 |
| Q | 24 | 80 | 3.12 | 4.59 | 88.2 | 6.1 | 42 | 0.79 | 256 | 16.0 | .00390 |
| S | 25 | 90 | 3.09 | 4.76 | 90.3 | 2.2 | 52 | 0.98 | 114 | 10.7 | .00878 |
| | | | | | | | $Q_o=53$ | | $\mu_o Q_o=53$ | 7.3 | .0189 |

*Observed effective absolute initial permeability.
NOTE.—Frequency: 1.177 mc./s.

TABLE VIII.—PROPERTIES OF SINTERED FERRITE TOROID CORES—COMPOSITION SERIES
[1.0($Li_2O \cdot 1.0TiO_2 \cdot 3Fe_2O_3$)-3.0($ZnO \cdot Fe_2O_3$)]

| Code No. 226 | LTZ | Zinc Ferrite Ratio, Percent | Core Volume, cm.³ | Apparent Density, g./cm.³ | Theoretical Density, Percent | Observed* Permeability | Toroidal Quality | $Q_c/Q_o$ | $\mu_t Q_t$ | $\sqrt{\mu_t Q_t}$ | $1/\mu_t Q_t$ |
|---|---|---|---|---|---|---|---|---|---|---|---|
| A | 1 | 0 | 4.89 | 3.95 | 88.3 | 42.2 | 76 | 1.43 | 3,207 | 56.6 | .00031 |
| C | 2 | 10 | 4.49 | 3.69 | 80.6 | 46.0 | 54 | 1.02 | 2,484 | 49.8 | .00040 |
| E | 3 | 20 | 4.33 | 3.85 | 82.5 | 85.4 | 59 | 1.11 | 5,039 | 71.0 | .00020 |
| G | 4 | 30 | 4.33 | 3.86 | 81.4 | 105.8 | 82 | 1.55 | 8,676 | 93.2 | .00012 |
| I | 5 | 40 | 5.11 | 3.79 | 78.5 | 144.2 | 94 | 1.77 | 13,555 | 116.4 | .00007 |
| K | 6 | 50 | 5.13 | 3.95 | 80.2 | 234.3 | 112 | 2.11 | 26,242 | 162.0 | .00004 |
| L | 7 | 55 | 4.31 | 4.25 | 85.5 | 221.7 | 97 | 1.83 | 21,505 | 146.7 | .00005 |
| M | 8 | 60 | 3.34 | 4.16 | 83.1 | 227.2 | 67 | 1.26 | 15,222 | 123.4 | .00007 |
| N | 9 | 65 | 3.48 | 4.18 | 82.8 | 251.0 | 56 | 1.06 | 14,056 | 118.6 | .00007 |
| O | 10 | 70 | 3.80 | 4.25 | 83.7 | 245.2 | 50 | 0.94 | 12,260 | 110.7 | .00008 |
| P | 11 | 75 | 3.31 | 4.47 | 87.2 | 24.9 | 27 | 0.51 | 672 | 25.9 | .00148 |
| Q | 12 | 80 | 3.20 | 4.54 | 87.7 | 2.5 | 51 | 0.96 | 128 | 11.3 | .00786 |
| S | 13 | 90 | 3.23 | 4.89 | 92.0 | (†) | | | | | |
| | | | | | | | $Q_o=53$ | | $\mu_o Q_o=53$ | 7.3 | .0189 |

* Observed effective absolute initial permeability.
† Specimen cracked.
NOTE.—Frequency: 1.177 mc./s.

TABLE IX.—PROPERTIES OF SINTERED FERRITE TOROID CORES—COMPOSITION SERIES
[$1.0(Li_2O \cdot 1.5TiO_2 \cdot 2Fe_2O_3)-2.5(ZnO \cdot Fe_2O_3)$]

| Code No. 234 | LTZ | Zinc Ferrite Ratio, Percent | Core Volume, cm.³ | Apparent Density, g./cm.³ | Theoretical Density, Percent | Observed* Permeability | Toroidal Quality | $Q_c/Q_o$ | $\mu_t Q_t$ | $\sqrt{\mu_t Q_t}$ | $1/\mu_t Q_t$ |
|---|---|---|---|---|---|---|---|---|---|---|---|
| A | 26 | 0 | 4.12 | 3.36 | 78.5 | 23.8 | 80 | 1.87 | 1,904 | 43.6 | .00053 |
| C | 27 | 10 | 4.28 | 3.48 | 79.5 | 36.0 | 84 | 1.96 | 3,024 | 55.0 | .00033 |
| E | 28 | 20 | 4.39 | 3.61 | 80.4 | 67.8 | 36 | 0.84 | 2,441 | 49.4 | .00041 |
| G | 29 | 30 | 4.42 | 3.64 | 79.0 | 97.9 | 48 | 1.12 | 4,699 | 68.6 | .00021 |
| I | 30 | 40 | 4.48 | 3.89 | 82.4 | 189.0 | 73 | 1.71 | 13,797 | 117.5 | .00007 |
| K | 31 | 50 | 4.04 | 4.02 | 83.3 | 349.0 | 85 | 1.99 | 29,665 | 172.2 | .00003 |
| L | 32 | 55 | 3.82 | 4.14 | 85.0 | 450.0 | 78 | 1.82 | 35,100 | 187.4 | .00003 |
| M | 33 | 60 | 3.84 | 4.18 | 84.8 | 546.0 | 68 | 1.59 | 37,128 | 192.7 | .00003 |
| N | 34 | 65 | 3.63 | 4.28 | 86.0 | 352.0 | 47 | 1.10 | 16,544 | 128.6 | .00006 |
| O | 35 | 70 | 3.69 | 4.33 | 86.2 | 16.2 | 26 | 0.61 | 421 | 20.5 | .0024 |
| Q | 36 | 80 | 3.60 | 4.47 | 87.2 | 1.9 | 42 | 0.98 | 80 | 9.0 | .0125 |
| S | 37 | 90 | 3.42 | 4.57 | 87.5 | 1.1 | 42 | 0.98 | 46 | 6.8 | .023 |
|  |  |  |  |  |  |  | $Q_o=53$ |  | $\mu_o Q_o=43$ | 6.6 | .023 |

* Observed effective absolute initial permeability.
NOTE.—Frequency: 1.177 mc./s.

TABLE X.—PROPERTIES OF SINTERED FERRITE TOROID CORES—COMPOSITION SERIES
[$1.0(Li_2O \cdot 2.0TiO_2 \cdot 1 Fe_2O_3)-2.0(ZnO \cdot Fe_2O_3)$]

| Code No. 242 | LTZ | Zinc Ferrite Ratio, Percent | Core Volume, cm.³ | Apparent Density, g./cm.³ | Theoretical Density, Percent | Observed* Permeability | Toroidal Quality | $Q_c/Q_o$ | $\mu_t Q_t$ | $\sqrt{\mu_t Q_t}$ | $1/\mu_t Q_t$ |
|---|---|---|---|---|---|---|---|---|---|---|---|
| A | 38 | 0 | (†) |  |  |  |  |  |  |  |  |
| C | 39 | 10 | (†) |  |  |  |  |  |  |  |  |
| E | 40 | 20 | 4.48 | 3.51 | 82.5 | 35.0 | 32 | 0.74 | 1,120 | 33.5 | 0.00089 |
| G | 41 | 30 | 4.56 | 3.71 | 84.5 | 64.6 | 49 | 1.14 | 3,165 | 56.3 | .00032 |
| I | 42 | 40 | 4.88 | 3.74 | 82.5 | 124.7 | 59 | 1.37 | 7,357 | 85.8 | .00014 |
| K | 43 | 50 | 4.54 | 3.86 | 82.5 | 306.0 | 63 | 1.46 | 19,278 | 138.8 | .00005 |
| L | 44 | 55 | 4.64 | 3.82 | 80.7 | 508.0 | 63 | 1.46 | 32,004 | 178.9 | .00003 |
| M | 45 | 60 | 4.30 | 3.99 | 83.0 | 437.0 | 49 | 1.14 | 21,413 | 146.3 | .00005 |
| N | 46 | 65 | 4.00 | 4.17 | 85.5 | 15.6 | 26 | 0.60 | 406 | 20.2 | .00246 |
| O | 47 | 70 | 3.82 | 4.22 | 85.5 | 2.9 | 40 | 0.93 | 116 | 10.8 | .0086 |
| Q | 48 | 80 | 3.77 | 4.33 | 85.3 | 1.6 | 42 | 0.98 | 67 | 8.2 | .0149 |
| S | 49 | 90 | 3.70 | 4.22 | 81.2 | 1.8 | 43 | 1.00 | 77 | 8.8 | .0130 |
|  |  |  |  |  |  |  | $Q_o=43$ |  | $\mu_o Q_o=43$ | 6.6 | .0232 |

* Observed effective absolute initial permeability.
† Specimens broken.
NOTE.—Frequency: 1.177 mc./s.

As can be seen from the foregoing data, the addition of zinc ferrite to the various substituted ferrites produces complex substituted ferrite compositions with substantially improved permeabilities. As the amount of zinc ferrite in the final composition is increased, the permeability increases rapidly to a maximum and then decreases, the permeability generally dropping below that of the original substituted ferrite alone as the substituted ferrite content drops below about 20 mole percent. Although the data shows the zinc ferrite content varying in increments of about 10 mole percent, the addition of at least about 1 mole percent of the zinc ferrite is usually sufficient to effect a substantial increase in permeability. As shown by the data, the greatest increases in permeability are achieved in the preferred compositions containing between about 30 and about 80 mole percent of the substituted ferrite end member ($m$), which corresponds to a zinc ferrite content of between about 20 and about 70 mole percent (100-$m$).

As shown by the above data, the circuit quality ratios of the inventive compositions exhibit two or more points at which extreme properties are evidenced. The resistivity follows a smooth curve, generally declining with increasing zinc ferrite content, while the densities vary from about 79 to 94 percent of theoretical.

In order to illustrate the synergistic effect achieved by the present invention, comparative data showing the properties of certain substituted ferrite end members and their counter-compositions containing a proportion of zinc ferrite is shown in the following table:

TABLE XI.—COMPARISON OF PROPERTIES OF ZINC-FREE AND ZINC-CONTAINING SINTERED FERRITE CORES

| Composition (Rod or Bar Cores) | Sintering Temp., °C. | Theoretical Density, Percent | Computed Effective Initial Permeability | Quality Ratio $Q_c/Q_o$ | Resistivity (Log Value), ohm-cm. |
|---|---|---|---|---|---|
| $1.00 Li_2O \cdot 5Fe_2O_3$ | 1,295 | 80.0 | 31.3 | 0.32 | 6.27 |
| vs. |  |  |  |  |  |
| $0.35 Li_2O \cdot 5Fe_2O_3-0.65 (ZnO \cdot Fe_2O_3)_4$ | 1,285 | 89.8 | 62.7 | 0.22 | 2.45 |
| $0.60 Li_2O \cdot 5Fe_2O_3-0.40 Li_2O \cdot TiO_2 \cdot 3Fe_2O_3$ | 1,313 | 76.3 | 33.8 | 0.47 | 3.12 |
| $0.40 Li_2O \cdot 5Fe_2O_3-0.60 Li_2O \cdot TiO_2 \cdot 3Fe_2O_3$ | 1,290 | 83.0 | 29.8 | 0.25 | 3.97 |
| Mean of the above | (1,302) | (79.7) | (31.8) | (0.36) | (3.55) |
| vs. |  |  |  |  |  |
| $0.40 Li_2O \cdot 0.5TiO_2 \cdot 4Fe_2O_3-0.60 (ZnO \cdot Fe_2O_3)3.5$ | 1,285 | 88.8 | 70.4 | 0.32 | 3.93 |
| $1.00 Li_2O \cdot TiO_2 \cdot 3Fe_2O_3$ | 1,250 | 85.3 | 30.9 | 0.43 | 3.78 |
| vs. |  |  |  |  |  |
| $0.40 Li_2O \cdot TiO_2 \cdot 3Fe_2O_3-0.60 (ZnO \cdot Fe_2O_3)_3$ | 1,285 | 83.2 | 72.8 | 0.20 | 4.20 |

| (Toroid Cores) | Sintering Temp., °C. | Theoretical Density, Percent | Permeability | $Q_c/Q_o$ | $\mu_t Q_t$ | $\sqrt{\mu_t Q_t}$ | $1/\mu_t Q_t$ |
|---|---|---|---|---|---|---|---|
| $1.00 Li_2O \cdot 5Fe_2O_3$ | 1,280 | 85.3 | 52.0 | 1.57 | 4,316 | 65.7 | .00023 |
| vs. |  |  |  |  |  |  |  |
| $0.50 Li_2O \cdot 5Fe_2O_3-0.50 (ZnO \cdot Fe_2O_3)_4$ | 1,285 | 86.2 | 163.5 | 2.58 | 22,400 | 149.7 | .00005 |
| $0.60 Li_2O \cdot 5Fe_2O_3-0.40 Li_2O \cdot TiO_2 \cdot 3Fe_2O_3$ | 1,280 | 79.5 | 40.2 | 2.43 | 5,186 | 72.0 | .00019 |
| $0.40 Li_2O \cdot 5Fe_2O_3-0.60 Li_2O \cdot TiO_2 \cdot 3Fe_2O_3$ | 1,280 | 79.5 | 36.4 | 2.36 | 4,550 | 67.4 | .00022 |
| Mean of the above | (1,280) | (79.5) | (38.3) | (2.40) | (4,868) | (69.7) | (.00020) |
| vs. |  |  |  |  |  |  |  |
| $0.40 Li_2O \cdot 0.5TiO_2 \cdot 4Fe_2O_3-0.60 (ZnO \cdot Fe_2O_3)3.5$ | 1,285 | 89.0 | 204.0 | 1.83 | 19,788 | 140.7 | .00005 |
| $1.00 Li_2O \cdot TiO_2 \cdot 3Fe_2O_3$ | 1,285 | 87.5 | 34.4 | 1.59 | 2,890 | 53.8 | .00035 |
| vs. |  |  |  |  |  |  |  |
| $0.35 Li_2O \cdot TiO_2 \cdot 3Fe_2O_3-0.65 (ZnO \cdot Fe_2O_3)_3$ | 1,285 | 82.8 | 251.0 | 1.06 | 14,056 | 118.6 | .00007 |

Specimens of pure zinc ferrite ($ZnO \cdot Fe_2O_3$) sintered at 1280° and having a theoretical density of 85% exhibited a permeability of 1.00 and a quality ratio of 0.995.

It is immediately evident from the above data that this invention increases the permeability of the substituted ferrite end members alone by as much as sevenfold. In most cases, this increase in permeability is accomplished by an increase in density and a decrease in the quality ratio. Also, the $\mu_t Q_t$ products and derived factors show a marked superiority over the properties of the substituted ferrite end members alone.

The ferrite materials of this invention are useful in a variety of electrical components. For example, the ferrites may be used as rod antenna cores; as cores for intermediate frequency and radio frequency coils, tuners, and transformers; as cores in television deflection yokes, magnetic amplifiers, and switching devices; as digital computer memory matrix elements; as magnetic recording heads; and as isolators or gyrators in microwave devices.

What is claimed is:

1. A ferrite material of spinel structure having the formula:

$$[m(Li_2O \cdot bRO_2 \cdot cFe_2O_3)] \cdot$$

$$\left[(100-m)\left(\frac{1+2b+3c}{4}\right)(R'O \cdot Fe_2O_3)\right]$$

wherein $b$ is from 0.5 to 2.5; $c$ is from 0 to 4; the sum of $b$ and $c$ is from 2.5 to 4.5; $m$ is from about 20 to about 99 mole percent; R is one of the cations titanium and manganese; and ($R'O \cdot Fe_2O_3$) is a normal ferrite, an inverse ferrite, or a mixed normal and inverse ferrite, R' being at least one of the cations zinc, cadmium, copper, magnesium, manganese, nickel and cobalt; said material containing at least about 10 mole percent $Fe_2O_3$ and having a magnetic permeability higher than that of the end member ($Li_2O \cdot bRO_2 \cdot cFe_2O_3$) alone.

2. A ferrite material as defined in claim 1 wherein $m$ is between about 30 and about 80 mole percent.

3. A ferrite material as defined in claim 1 wherein R is titanium, $b$ is from 0.5 to 2.0, and $c$ is from 1.0 to 4.0.

4. A ferrite material in accordance with claim 3 having the formula $$m(Li_2O \cdot 0.5TiO_2 \cdot 4Fe_2O_3) \cdot (100-m)3.5(ZnO \cdot Fe_2O_3)$$

5. A ferrite material in accordance with claim 3 having the formula $$m(Li_2O \cdot TiO_2 \cdot 3Fe_2O_3) \cdot (100-m)3(ZnO \cdot Fe_2O_3)$$

6. A ferrite material in accordance with claim 3 having the formula $$m(Li_2O \cdot 1.5TiO_2 \cdot 2Fe_2O_3) \cdot (100-m)2.5(ZnO \cdot Fe_2O_3)$$

7. A ferrite material in accordance with claim 3 having the formula $$m(Li_2O \cdot 2TiO_2 \cdot Fe_2O_3) \cdot (100-m)2(ZnO \cdot Fe_2O_3)$$

8. A ferrite material as defined in claim 1 wherein $c$ is from 1.0 to 4.0.

9. A ferrite material as defined in claim 1 wherein R is titanium, R' is zinc, $b$ is from 0.5 to 2.0, and $c$ is from 1.0 to 4.0.

References Cited

UNITED STATES PATENTS

| | | | |
|---|---|---|---|
| 2,751,353 | 6/1956 | Gorter | 252—62.61 |
| 3,096,288 | 7/1963 | Sarakauskas | 252—62.59 |

TOBIAS E. LEVOW, Primary Examiner

R. D. EDMONDS, Assistant Examiner

U.S. Cl. X.R.

252—62.6, 62.61, 62.62, 62.64